Dec. 26, 1967        H. W. SAMO        3,359,679
UNITARY REFLECTION DOLL EYE WITH INTEGRAL DARK BACKGROUND
Filed April 7, 1965        2 Sheets-Sheet 1
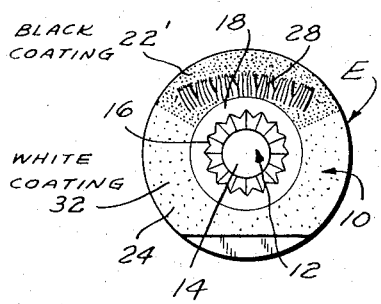
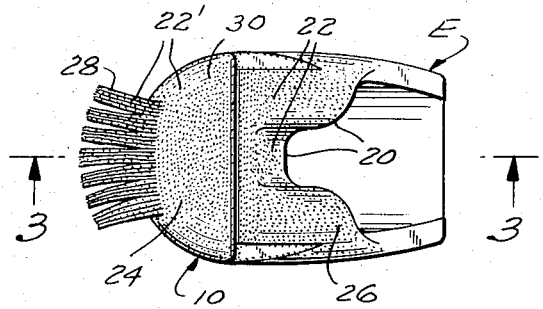
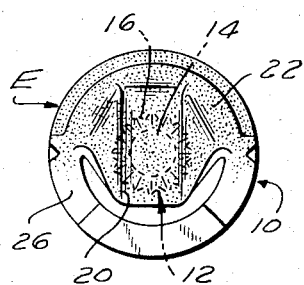
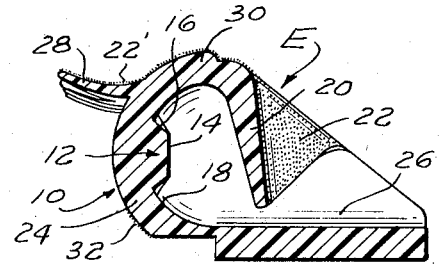
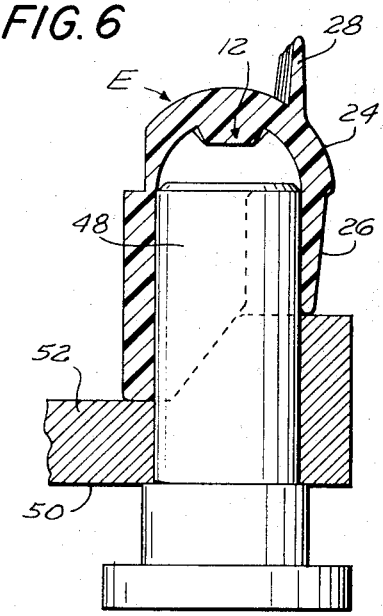
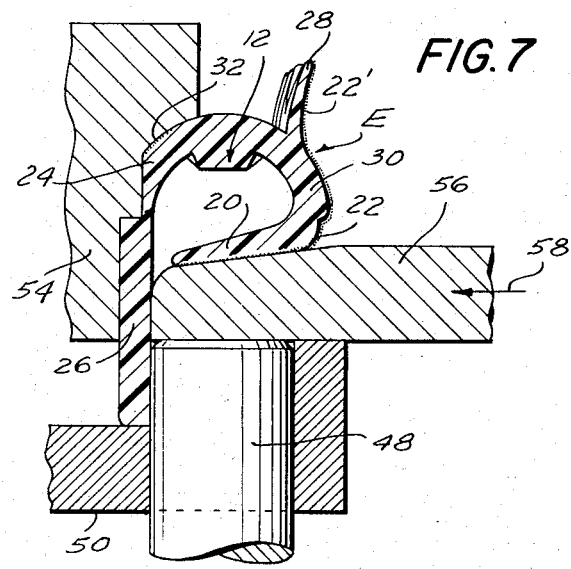
INVENTOR
HARVEY W. SAMO
BY
ATTORNEY Dec. 26, 1967    H. W. SAMO    3,359,679
UNITARY REFLECTION DOLL EYE WITH INTEGRAL DARK BACKGROUND
Filed April 7, 1965    2 Sheets-Sheet 2

INVENTOR
HARVEY W. SAMO
BY
ATTORNEY

United States Patent Office

3,359,679
Patented Dec. 26, 1967

3,359,679
UNITARY RELECTION DOLL EYE WITH INTEGRAL DARK BACKGROUND
Harvey W. Samo, Maplewood, N.J., assignor to Margon Corporation, Newark, N.J., a corporation of New Jersey
Filed Apr. 7, 1965, Ser. No. 446,204
4 Claims. (Cl. 46—165)

ABSTRACT OF THE DISCLOSURE

A unitary doll eye of this iris "reflection" type made of a plastic material and having an integrally formed back member for introducing the dark background for the pupil nd iris areas of the doll eye.

---

This invention relates to doll eyes and more particularly to a doll eye composed of a unitary or one-piece body of transparent plastic material.

The prime object of my present invention pertains to the provision of a doll eye of this iris "reflection" type made out of a unitary body of transparent molded plastic material having an integrally formed back member or part for introducing the dark background for the pupil and iris areas of the doll eye.

In my Patent No. 2,657,500 patented November 3, 1953, I teach the making of a doll eye in which the entire eyeshell including the lens is made out of a single body of transparent plastic material, and which is structured to produce, in association with a dark background for the lens, all of the body color differentia required for a doll eye. Thus, the eyeshell is tinted appropriately for the eye color desired, the plastic material being inherently tinted blue or brown for a blue or brown eye, or left untinted for a gray eye; the pupil portion of the lens, as well as the rim portion surrounding the iris, being transparent, is made to transmit and hence to be non-reflective to incident light, and the iris portion of the lens is radially and prismatically serrated to reflect incident light. When associated with a dark background, as when the eye is mounted in a head, shell or socket provided with a dark background, the pupil portion and the rim portion appear black and the "reflection" iris portion reflects light of a color similar to the color of the transparent plastic material. The doll eye may be finished by coating the front portion of the eyeshell with a white tint to simulate the eyeball and by coating the part above the lens with a flesh color tint to simulate the eyelid.

In the patent to Prupis No. 2,828,581, patented April 1, 1958, disclosing a doll eye embodying these principles of my said patent, it is shown that the dark background, supplied by the housing for the doll eye, may also be obtained by coating the back of the pupil portion with a black tint pigment; and in my Patent No. 3,092,931, patented June 11, 1963, I point out that when the iris rim and the pupil areas are imprinted with a black tint to provide the desired dark background for these areas. a difficulty arises due to the liability of the ink spreading to the grooved or serrated part of this iris. It has also been the practice to supply this dark background by inserting a black mask or disc into the eyeshell behind the lens areas; but this involves an added member and the trouble of inserting the same in the eyeshell. Moreover, for small and particularly miniature fixed (as distinguished from movable or "sleeping") doll eyes, the difficulties of applying the black tint to the pupil and rim areas or inserting a black mask or disc are greatly magnified.

In the doll eye of present invention, all of the above stated prior techniques of supplying the dark background for the reflection iris lens are obviated with the elimination of their attendant problems. The molded doll eye is formed rearwardly with a back member of portion exteriorly coated with a dark color pigment and infolded over and in properly spaced relation behind the eye lens area to provide the dark background for the pupil, iris and rim portions of the lens.

While a such doll eye may be made part of a so-called individual movable ("sleeping") eye comprising an eyeshell mounted in a housing received by a socket of a doll's head, the doll eye has particular applicability to the unit stationary or fixed eyes which are inserted directly into the sockets of doll heads, and more particularly heads (and sockets) made of a translucent plastic material, and which latter therefore are not light-excluding. The doll eye of the present invention is particularly useful when made as miniature and tiny eyes mountable in translucent eye sockets, in which cases supplying the dark background by inserted masks, tinting the pupils and iris areas, etc., involve tedious and difficult tasks.

Unitary molded doll eyes of the invention are also formed with an eyelash portion, so that the unit doll eye comprises the following component parts: an eyeshell, the said shell being frontally formed with a "reflection" iris lens and with an eyelash above the lens, the said shell being rearwardly formed with a back portion exteriorly coated with a dark pigment, which back portion in the final eye is positioned in spaced relation behind the pupil, iris and rim areas of the lens supplying the dark background therefor. I have found that in such unitary doll eyes, the flesh color coating which is usually applied frontally to the shell above the lens to simulate the eyelid may be supplanted by applying to this area a black coating instead, which may also cover the top of lash imparting to the lash an unusually attractive appearance. The method of making the doll eye of the invention is thereby also simplified by applying in the same step the dark color pigment to the said back portion of the shell, the top of the lash and the shell area above the lens.

To the accomplishments of the foregoing objects and such other objects as may hereinafter appear, the invention relates to the unitary "reflection" iris doll eye defined in the appended claims taken together with the following description thereof and the accompanying drawings, in which:

FIG. 1 is a front elevational view of the doll eye of the invention;

FIG. 2 is a top plan view thereof;

FIG. 3 is a view taken in cross-section in the plane of the line 3—3 of FIG. 2;

FIG. 4 is a rear elevational view thereof;

FIG. 6 is a view partly in section showing the means in the automated equipment of FIG. 5 for mounting the doll eye; and FIG. 7 is a view also shown partly in section of the means in the automated equipment of FIG. 5 which may be used for infolding the back portion of the doll eye.

Figure 5:
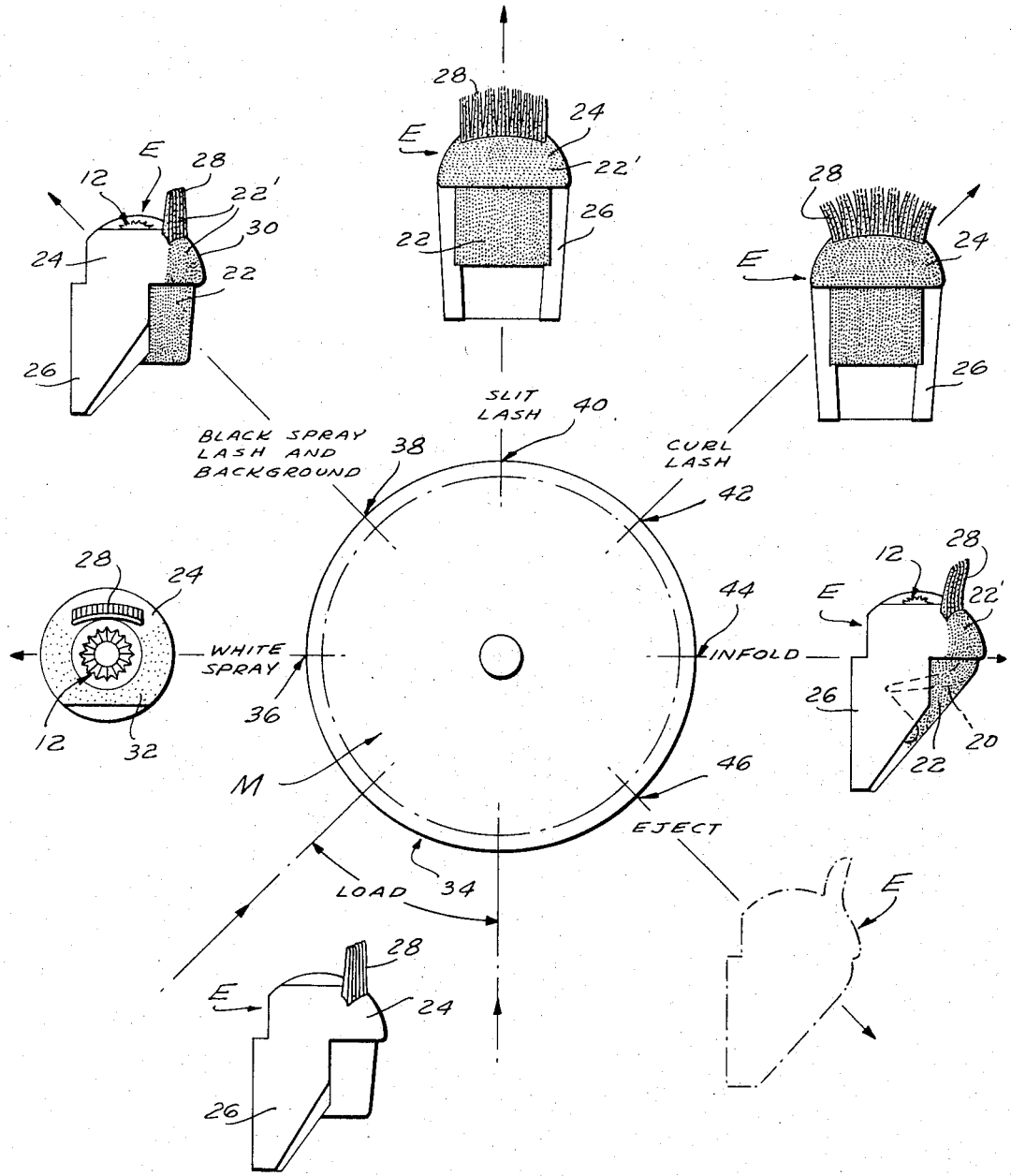
FIG. 5 is a diagrammatic view of a dial machine exemplifying the automated equipment which may be used and wherein all of the steps of making the completed doll eye from a molded shell are shown to be carried out in a continuous sequence of steps.

Referring now more in detail to the drawings, I show in FIGS. 1 to 4 thereof the completed doll eye of the invention, the said doll eye generally designated as E comprising an eye member made out of a unitary body of transparent plastic material and comprising the following component parts:

An eye shell generally designated as 10, the said eye shell being frontally formed with a lens generally designated as 12, the lens comprising a pupil portion 14 shaped to transmit incident light, a radially and prismatically serrated iris portion 16 surrounding the pupil portion shaped to reflect incident light and a rim portion 18 surrounding the iris portion and shaped to transmit incident light, the said eye shell being rearwardly formed with an infolded portion 20 positioned in spaced relation behind the areas (pupil, iris, and rim) of the lens 12, the said infolded portion being exteriorly coated over its surface with a dark color such as a black pigment 22, thereby providing a dark background for the said lens areas. The eye member is preferably shaped to provide a semi-spherical front portion 24 and a generally cylindrical back portion 26, a part of this back portion being inset to produce the infolded portion 20.

The transparent plastic material of the eyeshell 10 is tinted appropriately for the eye color desired, the plastic material being tinted blue or brown for a blue or brown eye, or left untinted for a gray eye. The pupil portion 14 and the rim portion 18 are transparent and are shaped to transmit, and therefore are non-reflective to, incident light; and the serrated iris portion 16 is shaped to reflect incident light. The dark background provided by the infolded and spaced back portion 20, covering as it does the lens areas, imparts to the pupil and rim area of the lens a black appearance, and the "reflection" iris area of the lens reflecting light of a color similar to the tint of the transparent plastic material of the eyeshell imparts the appearance of this color thereto, when the doll eye is viewed frontally.

The eyeshell is also preferably formed integrally with an eyelash portion 28 surmounting the lens 12 which in its finished form may be slit or curled as depicted in FIGS. 1 to 3 of the drawings. As heretofore stated, I have found that in the unitary doll eye of the invention, the flesh color coating which is usually applied to the shell above the lens to simulate the eyelid, may be supplanted by applying to this area a black coating instead, which may also cover the top of the lash imparting to the lash an unusually attractive appearance. I therefore apply to the area 30 of the eyeshell and to the top of the lash 28 a dark color such as a black pigment 22', the same as the applied black pigment 22 and in the same application step. The coloring of the doll eye is completed by coating the front portion of the semispherical part 24 of the eyeshell in an arc surrounding the areas of the lens 12 with a white tint 32 to simulate the eyeball of the eye.

Referring now to FIG. 5 of the drawings, I show diagrammatically a dial machine for making the completed doll eye from a molded eyeshell in a continuous sequence of steps. The full sequence of operation may be carried out by the dial machine, generally designated as M, into which molded eyeshells E are loaded at a loading station 34, said doll eye being subjected in sequence to the following operations: the applying of the described white coating 32 as by means of a spray at the station 36, the applying as by means of a spray to the back part 20, the top part 30 and the top of the lash 28, in one step or operation the black tint 22 and 22', this at the station 38, the slitting of the lash 28 at the station 40, the curling of the slitted lash 28 at the station 42, the infolding of the back part 20 of the eyeshell at the station 44 and finally the ejecting of the finished eye E at the station 46.

In FIGS. 6 and 7 of the drawings I show typical means or mechanism for mounting the eye member and for infolding the back portion 20 which may be employed in the automated equipment illustrated in FIG. 5 of the drawings. In FIG. 6 the eyeshell E as received at the loading station is mounted over a post 48 reciprocally movable in a support 50, the eyeshell being supported at its bottom on a nest 52. At the infolding station depicted in FIG. 7 the eyeshell E is engaged rearwardly by a nesting member 54, and with the post 48 moved to a descended position, a folding punch 56 is moved in the direction indicated by the arrow 58 for infolding the back part 20 to an extent to fully overly, and spaced rearwardly from, the pupil, iris and rim areas of the lens 12. After this operation the eyeshell E is moved to the ejecting station 46 where, freed from the nest member 54 and the punch 56, is blow-ejected from the dial machine.

The unitary "reflection" doll eye of the invention, the method of making the same and the various particularized uses and advantages thereof over the prior practices of making unitary reflection doll eyes will in the main be fully apparent from the above detailed description thereof. It will be further apparent that many changes may be made in the structure of the eyeshell and in the steps of the method without departing from the spirit of the invention defined by the following claims.

I claim:

1. A doll eye comprising an eye member made out of a unitary body of transparent plastic material and comprising the following component parts: an eyeshell, the said eyeshell being frontally formed with a lens comprising a pupil portion shaped to transmit incident light and an iris portion surrounding the pupil portion shaped to reflect incident light, the said eyeshell being rearwardly formed with an infolded portion positioned in spaced relation behind the lens pupil and iris portions, the said infolded portion being exteriorly coated with a dark color pigment providing thereby a dark background for the lens pupil and iris portions.

2. A doll eye according to claim 1, in which the eyeshell is also formed with an eyelash portion, the eyelash portion being exteriorly coated with a dark color pigment the same as the dark color pigment coating the said inset portion.

3. A doll eye comprising an eye member made out of a unitary body of transparent plastic molded material and comprising the following component parts: an eyeshell, the said eyeshell being frontally formed with a lens comprising a pupil portion shaped to transmit incident light, an iris portion surrounding the pupil portion shaped to reflect incident light, and a rim portion surrounding the iris portion and shaped to transmit incident light, the said eyeshell being rearwardly formed with an infolded portion positioned in spaced relation behind the lens pupil, iris and rim portions, the said infolded portion being exteriorly coated with a dark color pigment providing thereby a dark background for the lens pupil, iris and rim portions.

4. A miniature doll eye comprising an eye member made out of a unitary body of transparent plastic molded material and comprising the following component parts: an eyeshell having a semi-spherical front portion, and a generally cylindrical back portion, the said eye front portion being formed with an eyelash portion, with a pupil portion shaped to transmit incident light, with an iris portion surrounding the pupil portion shaped to reflect incident light, and with a rim portion surrounding the iris portion and shaped to transmit incident light, the said cylindrical back portion of the eyeshell being formed with an infolded portion positioned in spaced relation behind the pupil, iris and rim portions, the said infolded portion being exteriorly coated with a dark color pigment providing thereby a dark background for the pupil, iris and rim portions, and the said eyelash portion being also coated with the same dark color pigment.

References Cited

UNITED STATES PATENTS

| | | |
|---|---|---|
| 1,963,129 | 6/1934 | Grubman. |
| 2,657,500 | 11/1953 | Samolewitz. |
| 2,753,660 | 7/1956 | Brudney. |
| 2,828,581 | 4/1958 | Prupis. |
| 3,092,931 | 6/1963 | Samo. |

ANTON O. OECHSLE, *Primary Examiner.*

F. BARRY SHAY, *Examiner.*

S. NATTER, *Assistant Examiner.*